United States Patent [19]

Draper et al.

[11] Patent Number: 4,622,819
[45] Date of Patent: Nov. 18, 1986

[54] STEAM TURBINE EXHAUST PIPE EROSION PREVENTION SYSTEM

[75] Inventors: Robert Draper, Churchill Boro, Pa.; George J. Silvestri, Jr., Winter Park; Homer G. Hargrove, Maitland, both of Fla.

[73] Assignee: Westinghouse Electric Corp., Pittsburgh, Pa.

[21] Appl. No.: 696,221

[22] Filed: Jan. 29, 1985

[51] Int. Cl.⁴ .............................................. F01K 19/00
[52] U.S. Cl. ...................................... 60/657; 60/685; 55/392; 55/461
[58] Field of Search ................... 60/646, 657, 685; 55/392, 394, 461

[56] References Cited

U.S. PATENT DOCUMENTS

| 619,207 | 2/1899 | Musnicki | 55/394 |
|---|---|---|---|
| 2,961,064 | 11/1960 | Fisher | 183/80 |
| 3,320,729 | 5/1967 | Stahl | 55/461 |
| 3,813,854 | 6/1974 | Hortman | 55/399 |
| 3,902,876 | 9/1975 | Moen et al. | 55/348 |
| 3,964,884 | 6/1976 | Judith et al. | 55/457 X |
| 3,989,489 | 11/1976 | Van't Sant et al. | 55/338 |
| 4,268,277 | 5/1981 | Rooker | 55/1 |
| 4,355,515 | 10/1982 | Cohen et al. | 60/657 |
| 4,527,396 | 7/1985 | Silvestri, Jr. | 60/685 |

FOREIGN PATENT DOCUMENTS

| 1912805 | 9/1970 | Fed. Rep. of Germany . |
| 2458819 | 6/1976 | Fed. Rep. of Germany . |
| 2357308 | 3/1978 | France ............... 55/457 |

Primary Examiner—Stephen F. Husar
Attorney, Agent, or Firm—R. S. Lombard

[57] ABSTRACT

A steam turbine exhaust pipe erosion prevention system is disclosed. The system is particularly adaptable to the exhaust system of a high pressure steam turbine of a nuclear power plant. The system includes a moisture pre-separator to remove damaging water droplets prior to exhausting through the exhaust nozzles of the exhaust hood of the turbine. The system also includes an erosion prevention device strategically positioned in close proximity to pipe bends between the exhaust hood and the moisture separator reheater. The erosion prevention device removes the water film formed by damaging water droplets near pipe bends.

21 Claims, 8 Drawing Figures

STEAM TURBINE EXHAUST PIPE EROSION PREVENTION SYSTEM

BACKGROUND OF THE INVENTION

This invention relates to steam turbines and more particularly to means for diminishing exhaust pipe erosion in steam turbines. Moisture leaving the exhaust system of a steam turbine generator, typical of a high pressure steam turbine used in nuclear plants, may cause erosion of the cross-under piping which connects the turbine exhaust hood and the moisture separator reheater. Exhaust pipes which connect the high pressure turbine with the moisture separator reheater in a nuclear power plant are subject to serious erosion damage. Damage is caused by the high velocity impact of coarse water droplets which have diameters of the order of 100 $\mu$m or greater. In pressurized water reactor steam generating systems saturated steam is produced at about 1,000 psig. Moisture is formed immediately as the expansion process begins in the high pressure stage of the turbine. The high pressure stage exhaust typically contains 11% by mass water. Before entering the low pressure stage the wet steam passes from the high pressure turbine exhaust hood to a moisture separator reheater via exhaust piping. Exhaust pipes leaving the exhaust hood at a low elevation are known as cross-under pipes. All current models of nuclear plant high pressure turbines have at least two cross-under pipe exhausts. Some models have a third exhaust which leaves the top center of the exhaust hood. This is also termed a crossunder pipe.

Erosion of cross-under exhaust pipes is a common problem in nuclear plants. It is believed that the erosion of the exhaust pipes is caused by the high velocity impact of moisture droplets. Erosion studies indicate that erosion damage is a very strong function of the droplet diameter in the range of diameter of 1 $\mu$m through 1,000 $\mu$m, and it is likely that all of the damage is caused by droplets in the size range of above 10 $\mu$m. It has been found that within a typical exhaust hood the wet steam turns abruptly within the hood and the hood acts as a very effective moisture separator. Present exhaust hoods, though, are not equipped with a means of collecting the water. Generally, in present exhaust hoods the water film which forms on the hood walls is swept toward the exhaust nozzles, whereupon the water film becomes re-entrained by the steam flow in the form of relatively large droplets. These droplets might be of order of diameter 1,000 $\mu$m.

In a typical high pressure nuclear turbine, i.e. having an inlet pressure of 1000 psig, as the flow leaves the last blade row of the high pressure turbine a fraction of the mass which flows as liquid is about 11%. Since the total flow entering a hood is typically 6 million lb/hr 11% moisture constitutes a moisture flow rate of $6.6 \times 10^5$ lb/hr. The fraction of the liquid which exists as small droplets (order of 1 $\mu$m diameter or less) and that which is in the form of large droplets (order of 100 $\mu$m diameter or greater) is problematical. Estimates place the large droplet fraction between 10 and 30%. This of course depends upon the location of the last liquid extraction point in the turbine. Even if the smallest estimate is used, about 66,000 pounds per hour of water in large droplet form enter each exhaust hood, however; measurements made at a nuclear power station suggest that 198,000 lb/hr (30% of total water) is a more representative figure.

As the flow leaves the annular expansion passage (blade ring) it divides and turns within the exhaust hood so that it might leave the hood through one of the exhaust nozzles. During this process centrifugal action tends to separate the moisture from the steam and deposit it on the walls. It has been calculated that the relatively small or primary droplets which are assumed to have a mean diameter of 1 $\mu$m, of these droplets 0.12% are centrifuged onto the walls. In a typical system it is estimated that the primary droplet flow rate is on the order of $4.62 \times 10^5$ lb/hr in each hood (70% of total moisture flow). The 0.12% of primary moisture separated accounts for 554 lb/hr of water deposited on the walls. In contrast to this, if coarse water droplets are assumed to have a mean diameter of 100 $\mu$m, 68% of these coarse droplets are centrifuged onto the walls of the exhaust hood. This accounts for $1.35 \times 10^5$ lb/hr of water deposited on the walls. The total amount of water centrifuged out of the flow within each hood may be taken to be $1.35 \times 10^5$ lb/hr.

Water deposited on the exhaust hood walls will be swept toward the exhaust nozzles. The principal mechanism for movement of the water is the sheering action imparted by the steam flow. Gravitational action is of secondary importance. Consequently, almost as much water is swept towards the vertically upward facing nozzle in a system that has such a nozzle as is swept toward each of the nozzles which point at a downward angle. Unless means are provided to collect the water on the exhaust walls, it will be sheered off the rim of the exhaust nozzles and will become re-entrained in the flow as it enters the exhaust pipes, creating a high mass flux of hypercoarse water. This hypercoarse water has a diameter range of several hundred through a thousand microns, which is quickly accelerated by the exhaust pipe steam to a velocity on the order of 250 ft/sec. It has been found that the rate of erosion on the exhaust pipes is a strong function of droplet diameter and droplet velocity.

A further compounding problem occurring in the typical exhaust piping between the turbine and the moisture separator reheater occurs at the pipe bends. In a typical exhaust pipe system between the turbine and the moisture separator reheater, the pipe bends are provided with turning vanes which are included to decrease pressure loss at the bends. Even if means are provided for collecting the liquid forming off the exhaust hood walls about 70% of the liquid will pass through the nozzles as small primary droplets and about 9.6% of the liquid will pass through the nozzles as large secondary droplets. Some of the benign primary droplets will be transformed into potentially damaging large droplets as the flow negotiates bends and turning vanes. It has been estimated that 11% of the flow in a high pressure exhaust hood ($6.6 \times 10^6$ lb/hr), is moisture and that typically 30% of this moisture flow is in the form of large droplets. If means are provided to remove the 68% portion of this flow which is deposited on the exhaust hood walls the moisture flow leaving the exhaust hood will be composed of $6.3 \times 10^4$ lb/hr secondary droplets and $4.62 \times 10^5$ lb/hr primary droplets. If the exhaust hood feeds equally into three exhaust pipes the moisture flow rates per pipe will be $2.1 \times 10^4$ lb/hr secondary droplets and $1.54 \times 10^5$ lb/hr primary droplets. Calculations indicate that 4600 lb/hr of the primary droplet flow will be centrifuged onto the turning vanes at each elbow and will be sheared off the trailing edges of the vanes in the form of damaging secondary droplets. It is further estimated that these droplets will impact the pipe within a distance of 5 feet downstream of the bend.

An object of the present invention is to provide means for collecting the damaging large droplets and prevent them from becoming re-entrained in the steam flow and thus reduce the incidence of pipe erosion.

SUMMARY OF THE INVENTION

The present invention provides a pipe erosion prevention system for an exhaust system of a steam turbine. The exhaust system typically includes one or more exhaust hood means or chambers. A typical exhaust hood has a wall with exhaust nozzle means passing therethrough. The exhaust system further comprises a fluid-carrying pipe means in fluid communication with the exhaust nozzle means for transporting the fluid from the exhaust nozzle. Typically the fluid is steam with entrained water.

The pipe erosion prevention system comprises a moisture pre-separator comprising a cup means having an inlet end in fluid communication with the exhaust hood means and an outlet end in fluid communication with the pipe means of predetermined diameter smaller than the inlet end. The exhaust nozzle means contains and supports the cup means. Channel means is formed between the inner surface of the exhaust nozzle means and the outer surface of the cup means. A first end of the channel means has a first opening means disposed between the inner surface of the nozzle means and the outer surface of the cup means proximate the inlet end. A second end of the channel means is sealed by a jointure of the outer surface of the cup means to the inner surface of the nozzle means at the outlet end. The channel means receives water flow through the first end.

Drain means are affixed to the nozzle means having second opening means through the nozzle means in fluid communication with the channel means, whereby erosion causing water droplets forming a water layer on the interior of the exhaust hood means wall which flows into the pre-separator is substantially diverted from flowing through the cup means, thereby diminishing pipe erosion downstream from the pre-separator.

In certain steam turbine hood designs also preferably included is a nozzle wick means of predetermined porosity substantially filling the channel of the moisture pre-separator, whereby erosion causing water droplets forming a water layer which flows into the pre-separator are diverted from flowing through the cup means by the capillary action of the wick means to flow through the channel means, thereby diminishing pipe erosion downstream from the moisture pre-separator.

Preferably the pipe erosion prevention system further comprises an erosion prevention device for fluid carrying pipe means. The erosion prevention device comprises a liner means disposed concentrically within the pipe means with a predetermined clearance between the liner means and the pipe means and placed immediately downstream of each pipe elbow. The clearance between the liner and the pipe defines an annular space. The liner means has a predetermined length. Liner wick means are provided positioned within and substantially filling the annular space. The liner wick means has opening means therethrough for diverting water to the annular space. Collection means are provided which is disposed within the annular space and positioned substantially parallel with the axis of the pipe for collecting a substantial portion of the diverted water.

Liner drain means is provided for draining the collected water comprising drain pipe means in fluid communication with the collection means, whereby erosion causing water droplets forming a water layer which flows through the pipe is substantially diverted from flowing therethrough, thereby diminishing reentrainment and subsequent erosion of the pipe.

It has been found utilizing the present invention there may be realized a great reduction in cross-under pipe erosion rate, a measurable increase in plant heat rate and a more compact moisture separator reheater design. It also eliminates the need for steam bleeding as an assist to moisture removal.

BRIEF DESCRIPTION OF THE DRAWINGS

For a better understanding of the invention reference may be had to the accompanying drawings exemplary of the invention, in which.

BRIEF DESCRIPTION OF THE PREFERRED EMBODIMENTS

Figure 1:
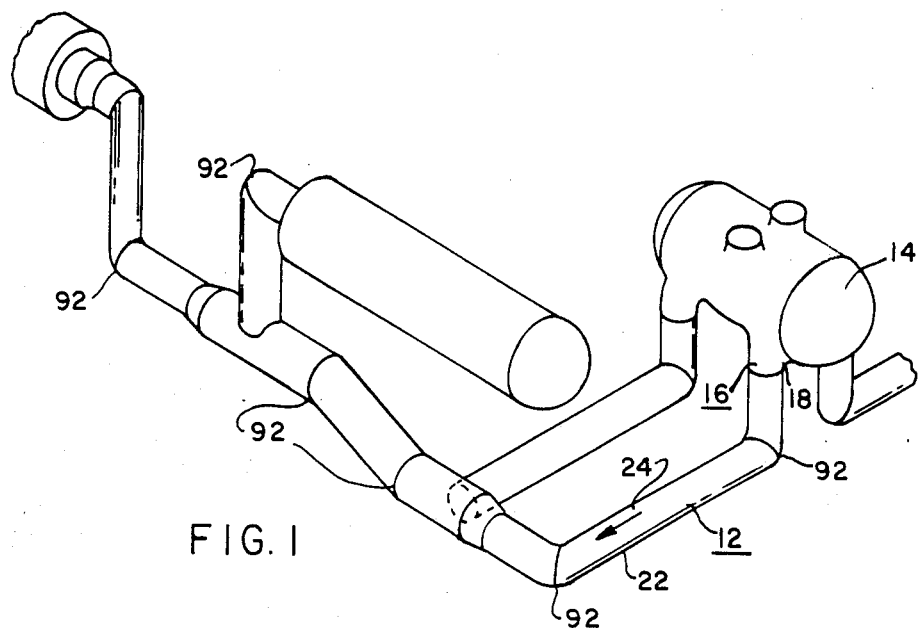
FIG. 1 is a schematic of a typical turbine exhaust system.

With reference to FIGS. 1-5 there is shown a pipe erosion prevention system 10 for an exhaust system 12 of a steam turbine 14. The exhaust system 12 typically includes exhaust hood means 16. The exhaust hood means 16 has a wall means 18. The wall 18 has exhaust nozzle means 20 passing therethrough. The exhaust system 12 further includes fluid carrying pipe means 22 in fluid communication with the exhaust nozzle 20 for transporting a fluid 24 such as steam with entrained water from the exhaust nozzle 20.

Figure 3:
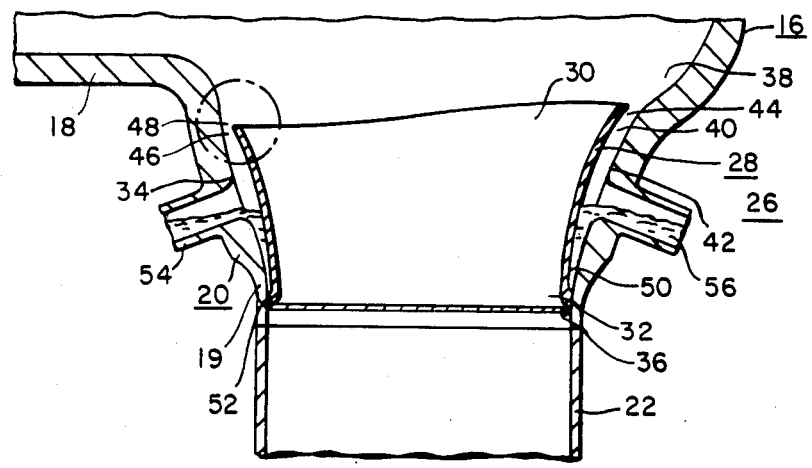
FIG. 3 is an elevational view of a cross-section of the moisture pre-separator.
Figure 4:
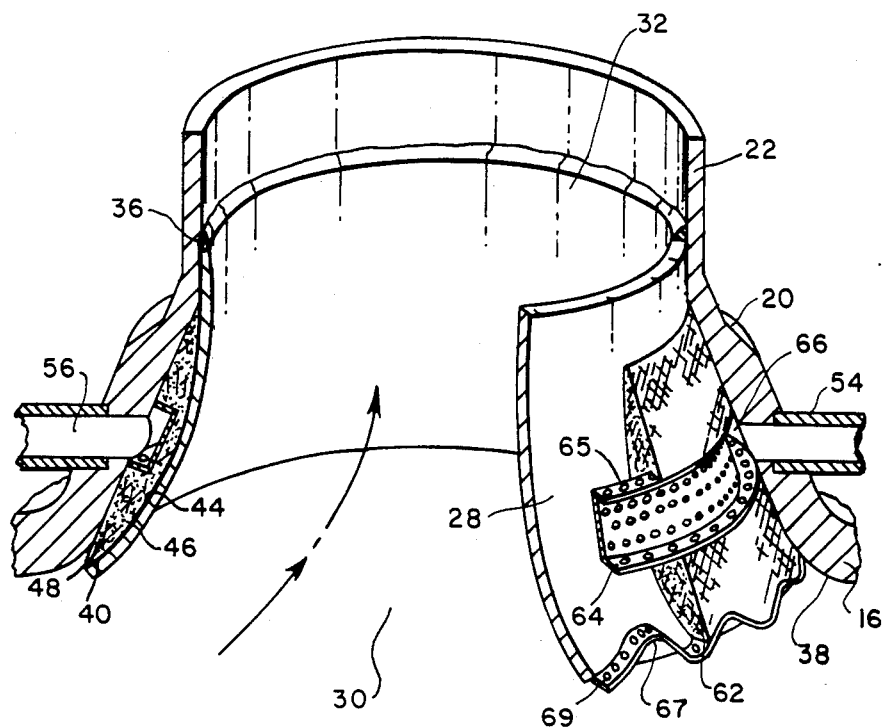
FIG. 4 is an isometric view of a cross-section of the moisture pre-separator equipped with a wick.

The pipe erosion prevention system 10 comprises a moisture pre-separator 26. The moisture pre-separator 26 includes cup means 28 having an inlet end 30 in fluid communication with the exhaust hood 16 and an outlet end 32 in fluid communication with the pipe means 22. The outlet end 32 is of a predetermined diameter smaller than the inlet end 30. The exhaust nozzle 20 contains and supports the cup 28. The cup 28 is flared as shown in FIGS. 3 and 4 and is positioned in the conical convergent section 34 of the exhaust nozzle 20. The outlet end 32 of the cup 28 extends into the lowest extremity 19 of the nozzle 20 as shown in FIGS. 3 and 4. At this location the cup 28 is affixed to the nozzle 20 by means of a fillet weld 36, for example, which extends entirely around the periphery of the cup 28 to provide support for the cup 28. The inlet end 30 of the cup is positioned in the nozzle 20 as shown in FIGS. 3 and 4 at an elevation at which the exhaust hood 16 makes the transition to become the mouth 38 of the exhaust nozzle 20. A channel means 40 is formed between the inner surface 42 of the nozzle 20 and the outer surface 44 of the cup 28. A first end 46 of the channel 40 has a first opening 48 disposed between the inner surface 42 of the nozzle 20 and the outer surface 44 of the cup 28 proximate the inlet end 30. A second end 50 of the channel 40 is sealed by a jointure 52 of the outer surface 44 of the cup 28 to the inner surface 42 of the nozzle 20 at the outlet end 32. The jointure 52 may be the fillet weld 36 as described previously, for example. The channel 40 is for receiving water flow through the first end 46. Drain means 54 is affixed to the nozzle 20. The drain 54 has a second opening means 56 through the nozzle 20 in fluid communication with the channel 40, a water layer formed on the interior of the exhaust hood means wall 18 whereby erosion causing water droplets which are centrifuged onto the wall flows into the pre-separator 26 is substantially diverted from flowing through the cup 28, thereby diminishing pipe erosion downstream from the preseparator 20. In addition to providing support for the cup 28 the jointure 52 being a fillet-weld, for example, provides a seal which prevents the water which is collected in the channel between the cup 28 and the nozzle 20 from entering the exhaust pipe 22.

In certain configurations it has been found desirable for the pipe erosion prevention system 58 to also include a nozzle wick means 62 of predetermined porosity substantially filling the channel 40 whereby erosion causing water droplets forming a water layer or film on the interior of the exhaust hood wall 18, as previously described, which flows into the pre-separator 26 is diverted from flowing through the cup 28 by the capillary action of the nozzle wick means 62 to flow through the channel 40 thereby diminishing pipe erosion downstream from the moisture pre-separator 26. It has been found that in exhaust hoods that do not exhaust vertically downward it may be desirable to include the nozzle wick 62 and may be applicable in certain designs to vertically downward facing exhaust hoods. It has been found that in nozzles exhausting vertically downwards, one possible confounding factor might be a pressure maldistribution around the inlet 30 of the cup 28. In the worst circumstances this would cause the liquid level in the cup 28 to be depressed below the drain 54 second openings 56. The second application where a nozzle wick 62 may be required is in nozzles exhausting downward at an angle from the vertical. In this case gravitational action will either offset or augment the manumetric disturbance which results from non-uniform steam velocity. Manumetric disturbance is defined as that change in surface elevation (or head) caused by a pressure distribution. The probability that one or more of the drains becomes inoperative is increased, however, normally the remaining drain pipes can handle the flow. Of greater concern is the increased likelihood that the cup 28 might overflow at some point around the inlet 30. It has been found in the case of nozzles exhausting downward at an angle from vertical that the design of the pre-separator 26 should include a deeper cup 28 with the drains as far from the inlet 30 as possible. It also may be desirable to include the nozzle wick 62 for promoting a capillary effect thereby overcoming the gravitational and kinetic effects.

A third application for use of the nozzle wick 62 is for nozzles exhausting upward. Generally there is no prospect of achieving a stable interface where the liquid, i.e., water is supported above the vapor in the cup 28. It has been found that both gravity and non-uniformity of the kinetic effects combine to create a situation where liquid would enter the cup 28 around a part of the inlet 30 and would leave the cup to become re-entrained with the vapor over the remainder of the inlet 30 of the cup 28. It is believed that perhaps as little as 10% of the liquid would enter the drains 54. By use of the nozzle wick 62 capillary forces can be made to dominate and stable extraction of the water can be achieved if the channel 40 is filled with a wicking material.

Preferably the nozzle wick 62 is a metal wick which fills the channel 40. The wick 40 can be of random fiber, woven mesh, sinter or bonded spheroid form. The wick porosity is preferably designed to be in the range 50 through 90% and median pore diameter will be in the range of 25 through 100 $\mu$m. By use of the nozzle wick 62 capillary and viscous forces are the factors governing flow of water from the first opening 48 of the channel to the drains 54. A short transfer path and a wick porosity which is as high as possible, consistent with satisfactory capillary action have been found to be desirable features. Also, with reference to FIG. 4, it has been found desirable to include a metal screen 64 which prevents wick material from entering the drains 54. The screen 64 is positioned on the inner surface 42 of the nozzle 20 opposite the drains 54 and is a continuous circumferential band that covers the drains 54 and prevents wick material from entering the drains 54. The screen 64 forms a plenum 66 within the channel 40. The flow path from the first opening 48 of the channel 40, through the nozzle wick 62, to the open plenum 66 between the screen 64 and the inner surface 42 of the nozzle 28 is short and as such permits low pressure drop, which is consistent with the maximum flow of water through the pre-separator 26. The screen 64 may be made of stainless steel and has screen perforations 65 therethrough on the order of 0.1 in diameter and has the dimensions 0.5 inches×4.0 inches. Also desirably included is a perforated metal barrier strip 67 to retain any portion of the wick 62 which may become separated over a period of time. The metal barrier strip 65 may be made of stainless steel and has strip perforations 69 therethrough on the order of 0.1 inch diameter. The barrier strip 67 as shown in FIG. 4 is positioned downstream of the inlet and 30 of the cup 28 and is affixed between the inner surface 42 of the nozzle and the outer surface 44 of the cup 44.

Figure 2:
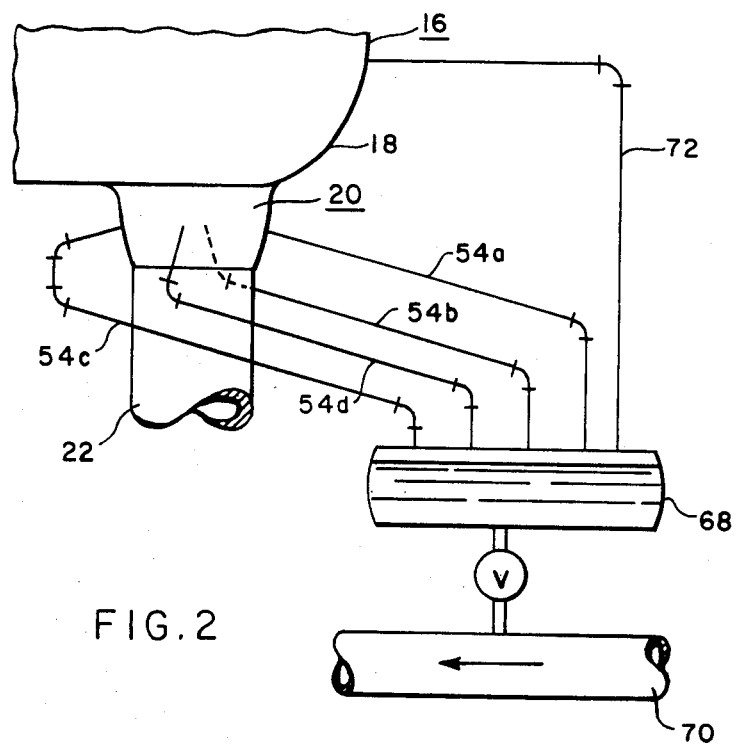
FIG. 2 is a schematic of the position of the moisture pre-separator relative to the exhaust hood and also showing the drain pipe headering for the moisture pre-separator.
Figure 3A:
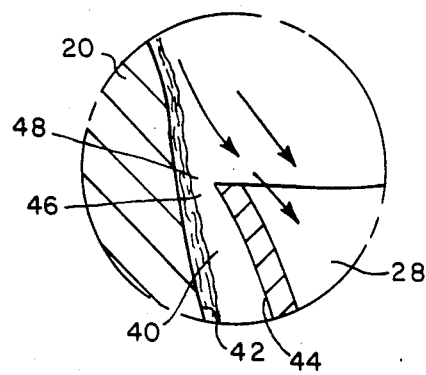
FIG. 3A is an enlargement of a portion A' of FIG. 3.

With reference to the preferred embodiment shown in FIGS. 3 and 3A of the moisture pre-separator 26, the mouth 38 of the exhaust nozzle 20 typically has a diameter of 36 inch. The exhaust nozzle 20 at the jointure 52 with the cup 28 typically has a diameter of 32 inches. The cup 28 has a height of 20 inches from inlet end 30 to outlet end 32. The circumference of the inlet end is sized so that the first opening 48 from the outer surface 44 of the cup 28 to the inner surface 42 of the nozzle 20 is ¾ inch around the circumference of the inlet end 30 of the cup 28. The drains 54 are connected to the nozzle as shown in FIGS. 2 and 3. The axis of the drain 54 is positioned such that an imaginary line extending from the axis to the cup would intersect the diameter of the cup 28 at a distance of 10 inches from the inlet end 30. The ¾ inch width dimension of the first opening 48 is an order of magnitude larger than the estimated thichness of the water layer or film at this point. This insures that if the water film thickness is not perfectly uniform, there is still little chance of the water overflowing the inlet 30 of the cup 28 and becoming re-entrained in the steam flow. The width of the channel 40 has a maximum value of approximately 3 inches at about mid height between the jointure 52 and the inlet end 30. It has been found that this provides sufficient capacity to allow the pre-separator 26 to handle surges in the water flow. The drains 54 are 4 inches in diameter and direct the water from the pre-separator 26 to the collection header 68 as shown in FIG. 2. The multiplicity of large diameter drains 54 insures that the water flow sustains a very small pressure drop and therefore undergoes minimal flashing. The collection header 68 is in fluid communication with the moisture separator reheater drain 70. A vent line 72 is desirably included to promote stable flow conditions if the flow in the drains 54 enters the "plug" flow regime.

In a retrofit application the flared cup 28 may be formed from several sections or petals which are welded together at the site. This may be necessary in order that the individual sections can be inserted through an open pipe 22 or the hood 16. In a new installation the cup 28 can be formed as a single piece.

When the nozzle wick 62 is used, it has been found that a key requirement for the wick material is that the capillary head exceed the required lift from the first opening 48 to the drains 54. This will provide hydrodynamic stability but in itself does not insure the required flow rate. A dynamic pressure drop must be established between the first opening 48 of the channel 40 and the second opening 56 in order to establish continuous flow. Without the capillary action of the wick 62 the dynamic pressure drop would promote a steam bleed rather than water drainage. Another key requirement for the wick is a low friction factor in order that the flashing of saturated water is minimized. Other requirements are chemical compatibility with all other steam system components, good corrosion resistance and sufficient mechanical strength to be self-supporting and its wicking characteristics should be well known with water. It has been found that sintered nickel and sintered stainless steel meshes meet these requirements. It has been found that a sample of wicking material identified as H12 in "Transfer Properties and Boiling Characteristics of Wicks", by Kunz, Langston, Hilton, Wyde and Hashick, NASA Report CR812, June 1967, is a desirable material for use as the nozzle wick 62. Of course other wicking materials may be used.

Figure 5:
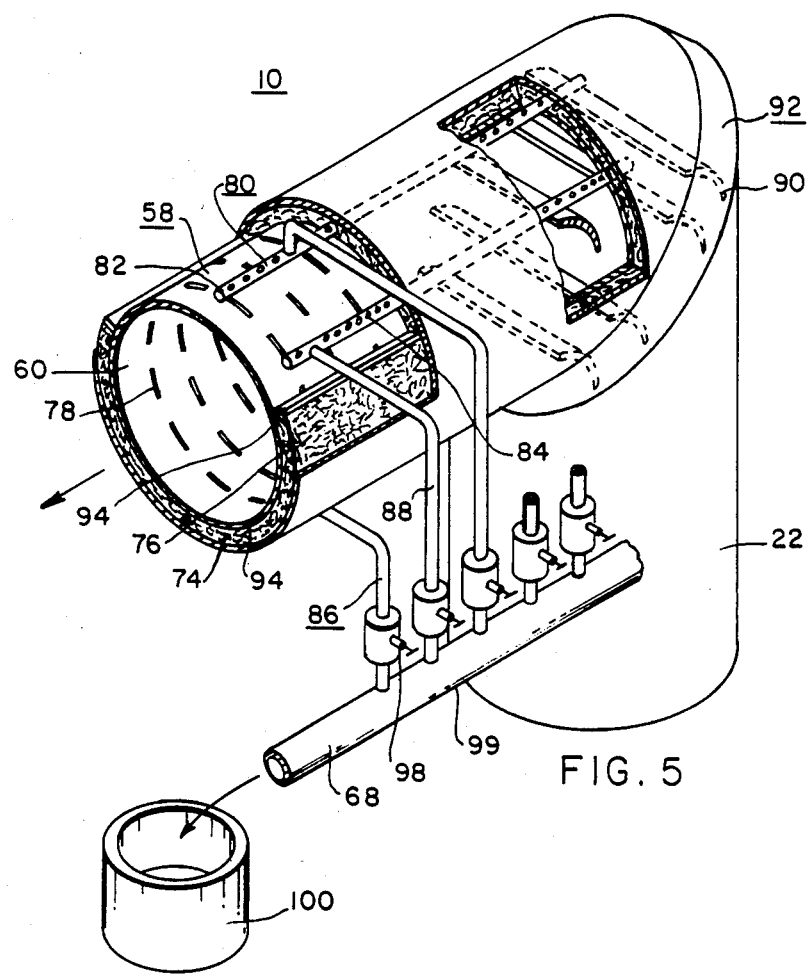
FIG. 5 is an isometric view partially broken away of a typical exhaust pipe bend showing the turning vanes and the erosion prevention device; and, FIG. 5A is an enlargement of Portion B' of FIG. 5.

Preferably the pipe erosion prevention system 10 further comprises an erosion prevention device 58 for a fluid-carrying pipe 22 as shown in FIG. 5. The device comprises liner means 60 disposed concentrically within the pipe means 22 with a predetermined clearance such as 0.5 inch between the liner 60 and the pipe 22, the clearance between the liner and the pipe defining an annular space 74. The liner 60 has a predetermined length such as 60 inch and is affixed at the ends 61a, 61b thereof to the pipe 22.

Figure 5A:
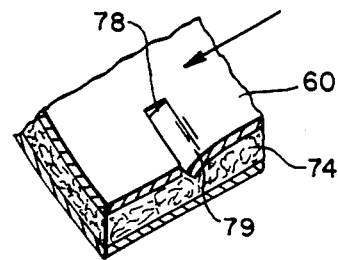

Liner wick means 76 is positioned within and substantially filling the annular space 74. The liner means 60 has third opening means 78 therethrough for diverting water to the annular space 74. The third opening means 78 may be configured as shown in FIG. 5A wherein the upstream side 79 of the third opening 78 is depressed toward the annular space 74. The third opening means 78 has an average area of 0.2 inch$^2$, for example, with 1400 such third openings 78 accounting for 5 percent of area of the liner 60. The liner end 61a is sealed to prevent re-entrainment of the diverted water into the steam flow.

Collection means 80 are disposed within the annular space 74 positioned substantially parallel with the axis of the pipe 22 for collecting a substantial portion of the diverted water. The collection means 80 preferably comprises collection pipe means 82. Fourth opening means 84 are disposed along the length of the collection pipe 82 as shown in FIG. 5.

Figure 6:
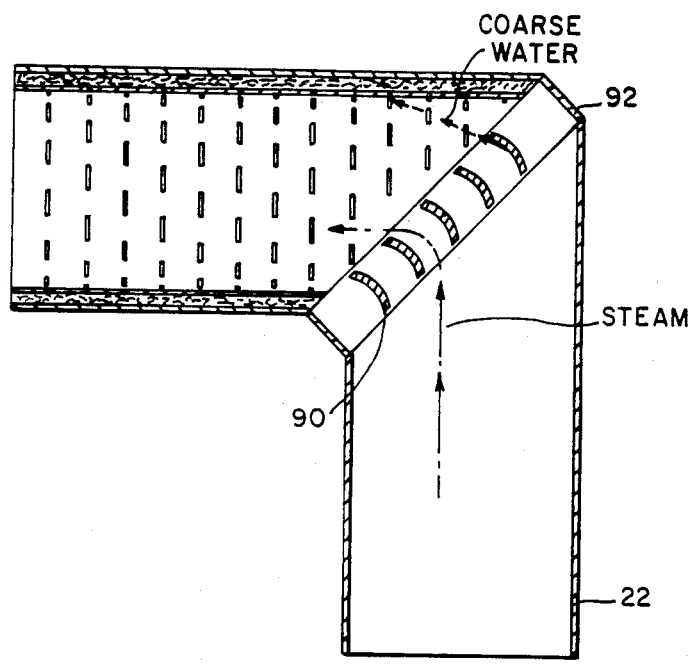
FIG. 6 is an elevational view of a typical pipe bend showing the turning vane's position and the trajectory of the coarse water impacting the exhaust pipe wall.

Liner drain means 86 are provided for draining the collected water. The liner drain means 86 comprises liner drain pipe means 88 in fluid communication with the collection means 68 whereby erosion causing water droplets forming a water layer which flows through the fluid-carrying pipe 22 is substantially diverted from flowing therethrough, thereby diminishing the erosion of the fluid-carrying pipe 22. As discussed previously it is the relatively large water droplets (order of 100 $\mu$m diameter or greater) which cause virtually all of the erosion damage. It has been found in the exhaust system 12 most of the water film formed by the damaging water droplets may be collected by use of the pre-separator 26 of this invention, however, some of the liquid passes through the nozzle 20 as small droplets which may be transformed into potentially damaging large droplets as the flow negotiates bends 92 and turning vanes 90 within the pipe 22 as shown in FIG. 6. By use of the erosion prevention device 58 the newly formed large droplets which form a water layer or film may be collected and managed in regions proximate each bend in the pipe 22. The large droplets or coarse water impact the pipe in a region extending up to about 5 feet downstream of a typical pipe bend or elbow at the rate of 4,600 lb/hr. However, the first elbow after the exhaust nozzle must deal with approximately 2.56$\times 10^4$ lb/hr (not newly formed) of coarse water, because of the estimated 2.1$\times 10^4$ lb/hr which escapes collection by the pre-separator 26. It has been calculated that the water is in the form of droplets of nominally 200 $\mu$m diameter traveling at a velocity which has a component normal to the axis of the pipe of abut 150 ft/sec. FIG. 6 shows the typical trajectory of the coarse water coming off the turning vanes 90. As shown in FIG. 5 the device 58 butts up against the turning vanes 90 and extends a distance of 5 feet from the inside corner of the bend 92. The liner 60 is preferably made of a high chromium or stainless steel with a thickness in the range of 0.06 inches through 0.09 inches. The third opening means 78 are in the form of circular holes of 0.1 diameter or louvered slots as shown in FIG. 5A. By virtue of the third opening 78, water which is collected on the liner 60 is diverted into the annular space 74. The liner wick 76 may be a stainless steel felt blanket, for example, which fills the proximate ½ inch wide annular space 74. The liner wick 76 will hold the water by virtue of surface tension as it flows around the annular space toward the liner drain means 86. The liner drain 86 means consists of between three and six liner drain pipes 88. The liner drain pipes 88 are approximately ⅜ inch in outside diameter perforated stainless steel tube which lie within the annular space 74 as shown in FIG. 5. Axial splitter plate means 94 are desirably included. By use of the axial splitter plates 94 the annular space 74 is divided into sections 96. One liner drain pipe 88 serves each section 96 and there is minimal communication between the sections. It has been calculated that the rate of collection of water is estimated to be typically 4,600 lb/hr and with a three liner collection pipe 82 design the pressure at the liner collection pipes 82 would be 0.35 lb/sq.in. below the static pressure within the liner 76 to insure complete removal of the water. Also the heat lost through the device 58 would cause a 0.21° F. reduction in water temperature which is equivalent to a 0.45 psi reduction in saturation pressure. Consequently, there would be no tendency for the water to flash into steam either in the liner wick 76 or the drain means 86. For the first elbow after the exhaust nozzle a larger annular space 74 (perhaps 1 inch) is required along with larger diameter drain means 86 (perhaps ¾ inch) to prevent excessive pressure drop and consequently flashing. This is due to the higher burden of collected secondary water at this elbow. Valve means 98 is located in each liner drain pipe 88 shown in FIG. 5 close to the point where the liner drain pipe 88 penetrates the drain heater pipe 99. Correct adjustment of the valve means 98 insures complete removal of the water without excessive bleeding of steam. Beyond the valve 98 the output of the drain pipe header means 99 is combined, cooled and decreased in pressure to a holding tank 100.

The present invention is especially applicable to the exhaust system of a high pressure steam turbine of a nuclear power plant where water formation may cause pipe corrosion problems. It is also applicable to any turbine exhaust system, such as a cogeneration system or combined cycle turbine system, where water formation may be a problem.

What is claimed is:

1. An erosion-prevention device for a fluid-carrying pipe means, said fluid comprising a discontinuous liquid phase portion, said device comprising:
   a. liner means of predetermined length and disposed concentrically within said pipe means with a predetermined clearance between said liner means and said pipe means, said clearance between said liner means and said pipe means defining an annular space, said liner means having opening means therethrough for diverting a liquid layer formed from said discontinuous liquid phase portion to said annular space said liner means affixed at the ends thereof to said pipe means;
   b. liner wick means positioned within and substantially filling said annular space;
   c. collection means disposed within said annular space positioned substantially parallel with the axis of said pipe means for collecting a substantial portion of said diverted liquid layer;
   d. liner drain means for draining said collected diverted liquid layer comprising drain pipe means in fluid communication with said collection means, whereby said liquid layer which is formed by said erosion causing liquid phase droplets is diverted from said pipe means thereby diminishing the erosion of said pipe means.

2. The erosion prevention device of claim 1 wherein said fluid-carrying pipe means, includes bend means for changing the direction of the flow of said fluid in said pipe means through a predetermined angle.

3. The erosion prevention device of claim 2, wherein turning vane means are housed within said bend means, said turning vane means of predetermined size and shape and disposed within said bend means for directing the flow of fluid through said bend section in a predetermined manner.

4. The erosion protection device of claim 3 wherein said device is located in predetermined close proximity to said bend means.

5. The erosion protection device of claim 1, wherein said discontinuous liquid phase portion consists of water droplets.

6. The erosion protection device of claim 1, wherein said liquid layer is water.

7. A fluid-carrying pipe means for an exhaust system of a steam turbine, said fluid comprising steam and water droplets, said fluid-carrying pipe means including an erosion prevention device comprising:
   a. a liner means disposed concentrically within said pipe means with a predetermined clearance between said liner means and said pipe means, said clearance between said liner means and said pipe means defining an annular space, said liner means having a predetermined length, said liner means having third opening means therethrough for diverting a water layer which is formed by centrifuging a substantial portion of said water droplets as the flow turns to said annular space, said liner means affixed at the ends thereof to said pipe means;
   b. liner wick means positioned within and substantially filling said annular space;
   c. collection means disposed within said annular space positioned substantially parallel with the axis of said pipe means, said collection means for collecting a substantial portion of said diverted water layer;
   d. liner drain means for draining said collected diverted water layer comprising liner drain pipe means in fluid communication with said collection means, whereby a water layer which is formed by erosion causing water droplets is diverted from said pipe means thereby diminishing the erosion of said pipe means.

8. The fluid-carrying pipe means of claim 7 wherein said fluid-carrying pipe means, comprises a plurality of fluid-carrying pipe members, bend means for changing the direction of the flow of fluid in said pipe means through a predetermined angle, said bend means formed at and by the juncture of one end of one of said pipe members with one end of a second of said pipe members at a predetermined angle.

9. The fluid-carrying pipe means of claim 8 wherein turning vane means is housed within a portion of said bend means, said turning vane means of predetermined size and shape disposed within said bend means to direct the flow of fluid through said bend section in a manner such as to limit pressure drop.

10. The fluid-carrying pipe means of claim 9 wherein said erosion protection device is located in predetermined close proximity to said bend means.

11. A moisture pre-separator for an exhaust system of a steam turbine said exhaust system including an exhaust hood, said exhaust hood including wall means having exhaust nozzle means passing there through, said moisture pre-separator comprising:
   a. cup means having an inlet end and an outlet end of predetermined diameter smaller than said inlet end;
   b. said exhaust nozzle means containing and supporting said cup means;
   c. channel means formed between the inner surface of said nozzle means, and the outer surface of said cup means, a first end of said channel means having a first opening means disposed between said inner surface of said nozzle means and said outer surface of said cup means proximate said inlet end, a second end of said channel means being sealed by a jointure of the outer surface of said cup means to the inner surface of said nozzle means at said outlet end, said channel means for receiving water flow through said first end;

d. drain means affixed to said nozzle means having second opening means through said nozzle means in fluid communication with said channel means whereby a substantial portion of the water layer formed by erosion causing water droplets which flows into said pre-separator is diverted from flowing through said cup means thereby diminishing pipe erosion downstream from said moisture pre-separator.

12. The moisture pre-separator of claim 11, further comprising wick means of predetermined porosity substantially filling said channel means, whereby a substantial portion of the water layer formed by erosion causing water droplets which flows into said pre-separator is diverted from flowing through said cup means by the capillary action of said wick means to flow through said channel means thereby diminishing pipe erosion downstream from said moisture pre-separator.

13. The moisture pre-separator of claim 12 further comprising screening means disposed between said wick means and said drain means whereby said wick means is prevented from entering said drain means.

14. The moisture pre-separator of claim 13 further comprising a perforated barrier strip means positioned downstream from said inlet end and affixed to the inner surface of said nozzle and the outer surface of said cup.

15. A exhaust system a steam turbine, said exhaust system including exhaust hood means, said exhaust hood means having wall means, said wall means having exhaust nozzle means passing therethrough, fluid-carrying pipe means in fluid communication with said exhaust hood means for transporting said fluid from said exhaust hood means, said exhaust system further comprising:

a. a moisture pre-separator comprising:
   i. cup means having an inlet end in fluid communication with said exhaust hood means and an outlet end in fluid communication with said pipe means, said outlet end of predetermined diameter smaller than said inlet end;
   ii. said exhaust nozzle means containing and supporting said cup means;
   iii. channel means formed between the inner surface of said exhaust nozzle means, and the outer surface of said cup means, a first end of said channel means having a first opening means disposed between said inner surface of said nozzle means and said outer surface of said cup means proximate said inlet end, a second end of said channel means being sealed by a jointure of the outer surface of said cup means to the inner surface of said nozzle means at said outlet end, said channel means for receiving water flow through said first end;
   iv. drain means affixed to said nozzle means having second opening means through said nozzle means in fluid communication with said channel means, whereby the water layer formed by erosion causing water droplets which flows into said pre-separator is substantially diverted from flowing through said cup means thereby diminishing pipe erosion downstream from said pre-separator.

16. The exhaust system stage of claim 15 wherein said moisture pre-separator further comprises a wick means of predetermined porosity substantially filling said channel means, whereby a water layer which is formed by erosion causing water droplets which flows into said pre-separator is diverted from flowing through said cup means by the capillary action of said wick means to flow through said channel means thereby diminishing pipe erosion downstream from said moisture pre-separator.

17. The exhaust system stage of claim 15, further comprising:

an erosion prevention device for a fluid-carrying pipe means, said device comprising;
   i. liner means disposed concentrically within said pipe means with a predetermined clearance between said liner means and said pipe means, said clearance between said liner and said pipe defining an annular space; said liner means having a predetermined length and affixed at the ends thereof to said pipe means;
   ii. liner wick means positioned within and substantially filling said annular space, said liner means having third opening means therethrough for diverting water to said annular space;
   iii. collection means disposed within said annular space positioned substantially parallel with the axis of said pipe for collecting a substantial portion of said diverted water;
   iv. liner drain means for draining said collected water comprising liner drain pipe means in fluid communication with said collection means, whereby a water layer which is formed by erosion causing water droplets which flows through said pipe is substantially diverted from flowing therethrough thereby diminishing the erosion of said pipe.

18. The high pressure turbine stage of claim 17, wherein said moisture pre-separator further comprises a wick means of predetermined porosity substantially filing said channel means.

19. A pipe erosion prevention system for a exhaust system a steam turbine, said exhaust system including exhaust hood means, said exhaust hood means having wall means, said wall means having exhaust nozzle means passing therethrough, fluid-carrying pipe means in fluid communication with said exhaust nozzle means for transporting a fluid from said exhaust nozzle means, said pipe erosion prevention system comprising:

a. a moisture pre-separator comprising:
   i. cup means having an inlet end in fluid communication with said exhaust hood means and an outlet end in fluid communication with said pipe means of predetermined diameter smaller than said inlet end;
   ii. said exhaust nozzle means containing and supporting said cup means;
   iii. channel means formed between the inner surface of said exhaust nozzle means, and the outer surface of said cup means, a first end of said channel means having a first opening means disposed between said inner surface of said nozzle means and said outer surface of said cup means proximate said inlet end, a second end of said channel means being sealed by a jointure of the outer surface of said cup means to the inner surface of said nozzle means at said outlet end, said channel means for receiving water flow through said first end;

iv. drain means affixed to said nozzle means having second opening means through said nozzle means in fluid communication with said channel means, whereby erosion a water layer formed by causing water droplets which flows into said pre-separator is substantially diverted from flowing through, said cup means thereby diminishing pipe erosion downstream from said pre-separator.

20. The pipe erosion prevention system of claim 19, further comprising:

an erosion prevention device for a fluid carrying pipe means, said device comprising:

i. liner means disposed concentrically within said pipe means with a predetermined clearance between said liner means and said pipe means, said clearance between said liner and said pipe defining an annular space; said liner means having a predetermined length and affixed at the ends thereof to said pipe means;

ii. liner wick means positioned within and substantially filling said annular space, said said liner means having third opening means therethrough for diverting water to said annular space;

iii. collection means disposed within said annular space positioned substantially parallel with the axis of said pipe for collecting a substantial portion of said diverted water;

iv. liner drain means for draining said collected water comprising liner drain pipe means in fluid communication with said collection means, whereby a water layer formed by erosion causing water droplets which flows through said fluid-carrying pipe is substantially diverted from flowing therethrough thereby diminishing the erosion of said fluid-carrying pipe.

21. The pipe erosion prevention system of claim 19, further comprising wick means of predetermined porosity substantially filling said channel means, whereby a water layer formed by erosion causing water droplets which flows into said pre-separator is diverted from flowing through said cup means by the capillary action of said nozzle means to flow through said channel means thereby diminishing pipe erosion downstream from said moisture pre-separator.

* * * * *